United States Patent [19]

Kajihara

[11] Patent Number: 4,929,085
[45] Date of Patent: May 29, 1990

[54] IMAGE DATA ROTATION PROCESSING METHOD AND APPARATUS THEREFOR

[75] Inventor: Shigehiro Kajihara, Tokyo, Japan

[73] Assignee: Kabushiki Kaisha Toshiba, Kawasaki, Japan

[21] Appl. No.: 100,713

[22] Filed: Sep. 24, 1987

[30] Foreign Application Priority Data

Sep. 30, 1986 [JP] Japan ................................. 61-231717
Nov. 29, 1986 [JP] Japan ................................. 61-284518

[51] Int. Cl.$^5$ ..................... G06F 15/40; G06F 15/626
[52] U.S. Cl. .................................. 364/518; 364/521; 340/727; 382/46
[58] Field of Search ......................... 364/521, 518, 519; 340/727, 72 H, 747, 750; 382/46, 44

[56] References Cited

U.S. PATENT DOCUMENTS

| | | | |
|---|---|---|---|
| 3,976,982 | 8/1976 | Eiselen | 364/900 |
| 4,168,488 | 9/1979 | Evans | 382/46 |
| 4,271,476 | 6/1981 | Lotspiech | 340/727 |
| 4,312,045 | 1/1982 | Jean et al. | 340/727 |
| 4,554,638 | 11/1985 | Iida | 340/727 |
| 4,593,407 | 6/1986 | Konishi et al. | 340/727 |
| 4,635,212 | 1/1987 | Hatazawa | 364/519 |
| 4,689,824 | 8/1987 | Mitchell et al. | 382/46 |
| 4,703,515 | 10/1987 | Baroody, Jr. | 382/46 |
| 4,729,107 | 3/1988 | Hasegawa et al. | 364/519 |
| 4,736,442 | 4/1988 | Kornfeld | 382/44 |

*Primary Examiner*—Gary V. Harkcom
*Assistant Examiner*—Phu K. Nguyen
*Attorney, Agent, or Firm*—Finnegan, Henderson, Farabow, Garrett and Dunner

[57] ABSTRACT

A rotation circuit includes a first holding section for sequentially latching n words input in units of words, in accordance with a first control instruction, each word consisting of n-bit data. The n words held in the first holding section are input to and latched by a second holding section. One bit of data is selected from each word latched by the second holding section, in accordance with a second control instruction, while the next one word is input to the first holding section, and a rotated word constituted by n bit data selected from n words is output from a selector section. The first and second control instructions are generated from a controller, in accordance with an input rotation control instruction, and are respectively supplied to the first holding section and the selector section.

14 Claims, 18 Drawing Sheets

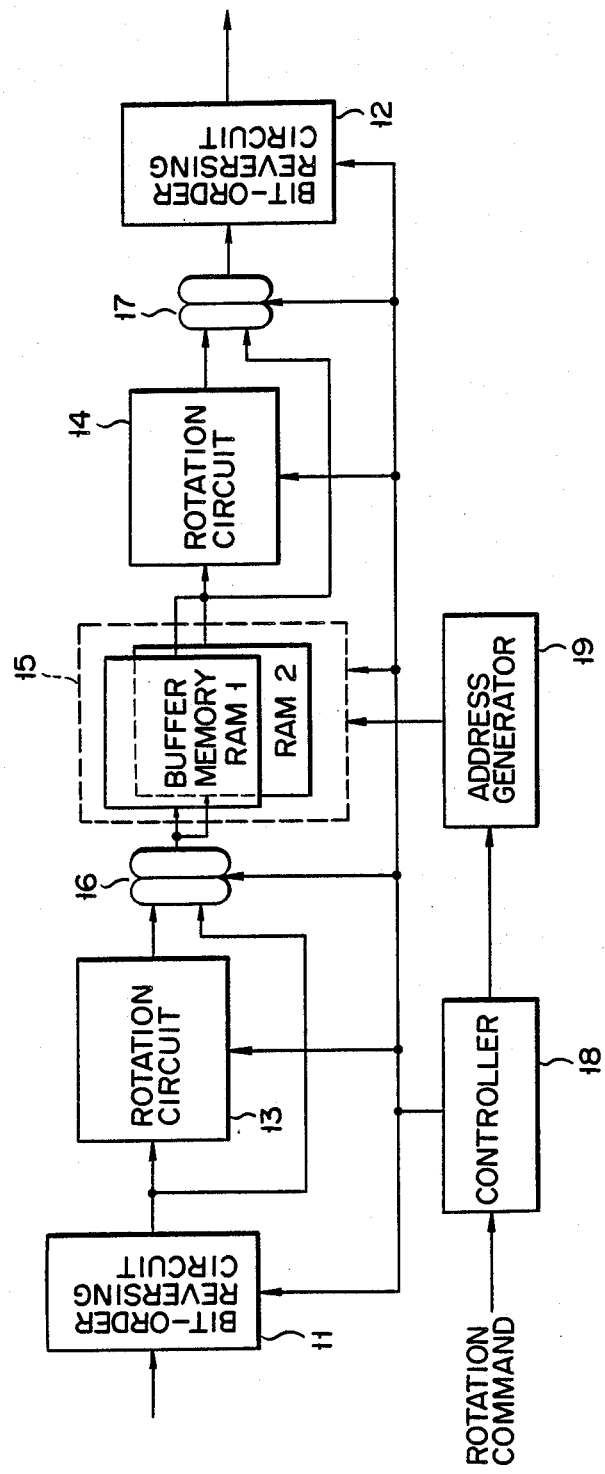
F I G. 3

| COMMAND | INPUT RASTER SCAN MODE | | | | OUTPUT RASTER SCAN MODE | | | |
| --- | --- | --- | --- | --- | --- | --- | --- | --- |
| | 0° | 90° | 180° | 270° | 0° | 90° | 180° | 270° |
| BIT-ORDER REVERSING CIRCUIT 11 | NOT | NOT | NOT | NOT | NOT | REV. | REV. | NOT |
| ROTATION CIRCUIT 13 | — | — | — | — | — | ROT. | — | ROT. |
| SELECTOR 16 (FROM) | 11 | 11 | 11 | 11 | 11 | 13 | 11 | 13 |
| ROTATION CIRCUIT 14 | — | ROT. | — | ROT. | — | — | — | — |
| SELECTOR 17 (FROM) | 15 | 14 | 15 | 14 | 15 | 15 | 15 | 15 |
| BIT-ORDER REVERSING CIRCUIT 12 | NOT | NOT | REV. | REV. | NOT | NOT | NOT | NOT |

F I G. 5

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 | 32 | 33 | 34 | 35 |
| 36 | 37 | 38 | 39 | 40 |
| 71 | 72 | 73 | 74 | 75 |
| 76 | 77 | 78 | 79 | 80 |
| 196 | 197 | 198 | 199 | 200 |

F I G. 6

FIG. 8A WORDS INPUT TO RAM 1

FIG. 8B WORDS INPUT TO RAM 2

FIG. 8C WORDS INPUT TO 14

FIG. 8D WORDS OUTPUT FROM 14

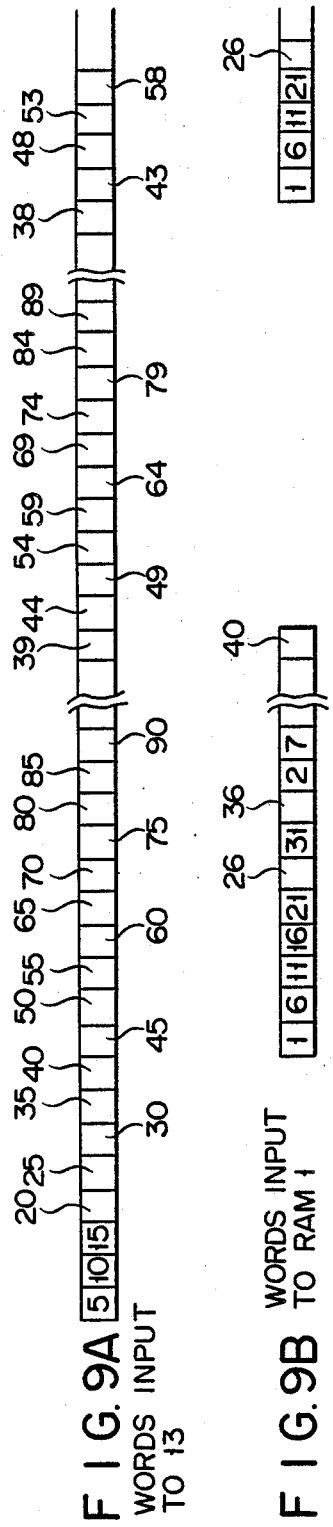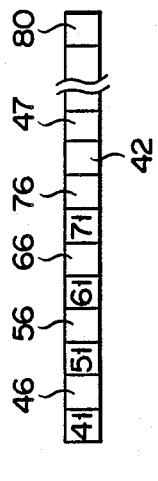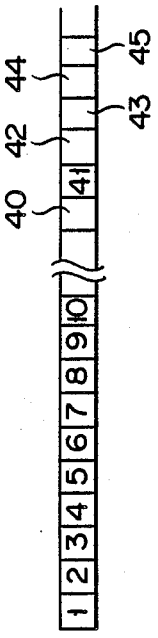
FIG. 9A WORDS INPUT TO 13
FIG. 9B WORDS INPUT TO RAM 1
FIG. 9C WORDS INPUT TO RAM 2
FIG. 9D WORDS READOUT FROM RAM 1 AND 2

| ANGLE | INPUT RASTER SCAN MODE | | | | OUTPUT RASTER SCAN MODE | | | |
|---|---|---|---|---|---|---|---|---|
| | 0° | 90° | 180° | 270° | 0° | 90° | 180° | 270° |
| BIT-ORDER REVERSING CIRCUIT 11 | NOT | NOT | NOT | NOT | NOT | REV. | REV. | NOT |
| SELECTOR 22 (FROM) | — | 15 | — | 15 | — | 11 | — | 11 |
| ROTATION CIRCUIT | — | ROT. | — | ROT. | — | ROT. | — | ROT. |
| SELECTOR 21 (FROM) | 11 | 11 | 11 | 11 | 11 | 14 | 11 | 14 |
| SELECTOR 23 (FROM) | 21 | 14 | 21 | 14 | 21 | 15 | 21 | 15 |
| BIT-ORDER REVERSING CIRCUIT 12 | NOT | NOT | REV. | REV. | NOT | NOT | NOT | NOT |

F I G. 11

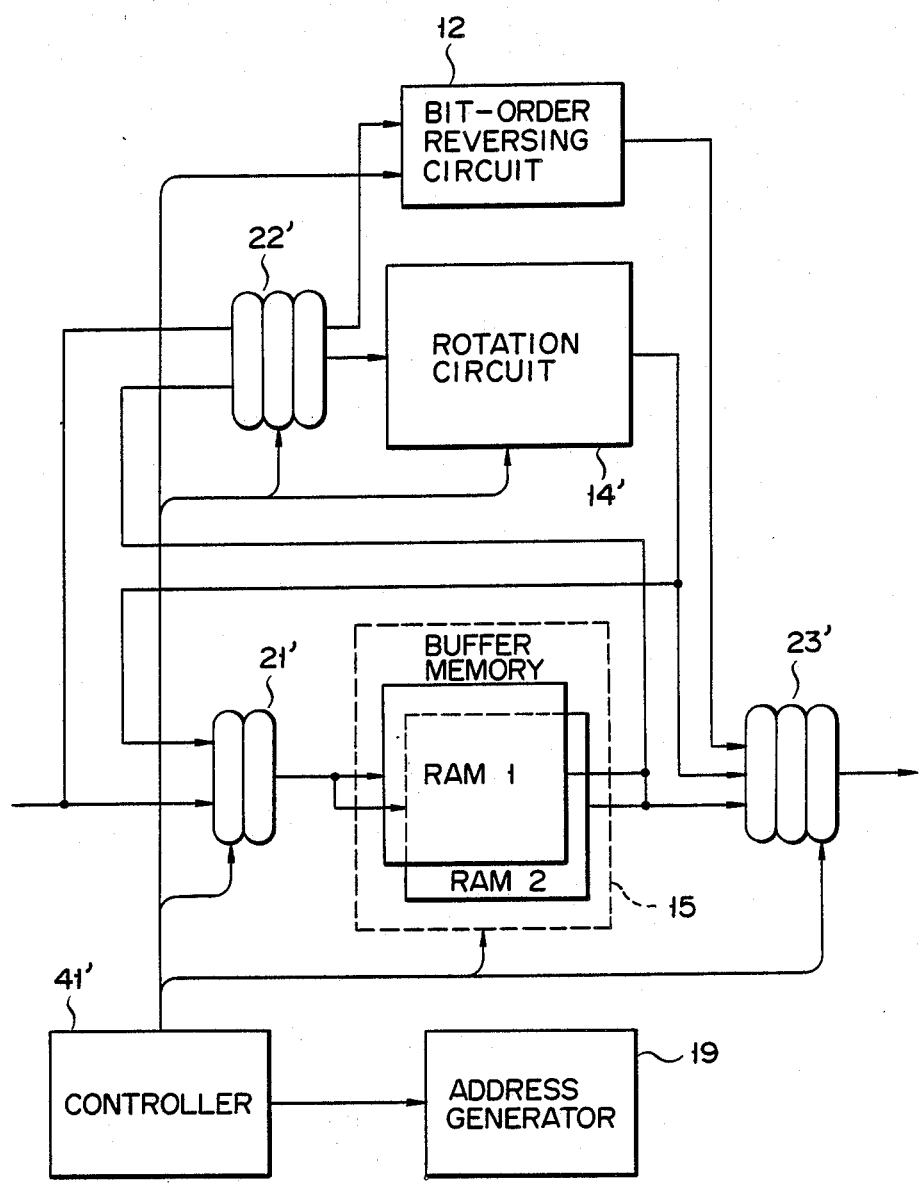
F I G. 12

| ANGLE | INPUT RASTER SCAN MODE | | | | OUTPUT RASTER SCAN MODE | | | |
| --- | --- | --- | --- | --- | --- | --- | --- | --- |
| | 0° | 90° | 180° | 270° | 0° | 90° | 180° | 270° |
| SELECTOR 22' (FROM) | EXT. | 15 | EXT. | 15 | EXT. | EXT. | EXT. | EXT. |
| ROTATION CIRCUIT 14' | — | ROT. | — | ROT.+ REV. | — | ROT.+ REV. | — | ROT. |
| BIT-ORDER REVERSING CIRCUIT 12 | NOT | — | REV. | — | NOT | — | REV. | — |
| SELECTOR 21' (FROM) | — | EXT. | — | EXT. | — | 14' | — | 14' |
| SELECTOR 23' (FROM) | 12 | 14' | 12 | 14' | 12 | 15 | 12 | 15 |

F I G. 13

|  | INPUT RASTER SCAN MODE | | | | OUTPUT RASTER SCAN MODE | | | |
|---|---|---|---|---|---|---|---|---|
| ANGLE | 0° | 90° | 180° | 270° | 0° | 90° | 180° | 270° |
| SELECTOR 22" (FROM) | EXT. | 15 | EXT. | 15 | EXT. | EXT. | EXT. | EXT. |
| ROTATION CIRCUIT 14" | NOT | ROT. | REV. | ROT. + REV. | NOT | ROT. + REV. | REV. | ROT. |
| SELECTOR 21" (FROM) | — | EXT. | — | EXT. | | 14" | | 14" |
| SELECTOR 23" (FROM) | 14" | 14" | 14" | 14" | 14" | 15 | 14" | 15 |

F I G. 15

IMAGE DATA ROTATION PROCESSING METHOD AND APPARATUS THEREFOR

BACKGROUND OF THE INVENTION

The present invention relates to a method for high-speed rotation of image data sent in units of words, a rotation processing system for implementing the method, and an image data rotating circuit incorporated in the system.

With the development of office automation, image data processing systems have become increasingly sophisticated. As a result, a large number of inexpensive ICs for image data processing are now available, which can process image data at a much higher speed than was previously possible. A conventional rotation processing system performing image data rotation processing using such an IC is arranged as shown in FIG. 1.

Referring to FIG. 1, page memory 51 stores image data before and after rotation. A read address generated by read address generator 52 and a write address generated by write address generator 53 are selected by selector 54, and the selected address is supplied to page memory 51. Read data (RD) from page memory 51 is temporarily latched by register 55, and is then rewritten in page memory 51. For example, assume that read address generator 52 generates a read address in a direction indicated by an arrow in FIG. 2A. At that time, if write address generator 53 generates a write address in a direction indicated by an arrow shown in FIG. 2B, image data can then be rotated counterclockwise through 90 degrees. If the write address is generated as shown in FIG. 2C, image data is rotated through 180 degrees. If the write address is generated as shown in FIG. 2D, image data is rotated through 270 degrees.

In this case, the page memory used in the conventional image data rotation processing system, can be accessed in units of words (n bits) in the horizontal direction, but can only be accessed in units of bits in the vertical direction. For this reason, the 0- or 180-degree rotation processing can be performed in units of words. However, 90- or 270-degree rotation processing words must be write accessed in units of bits. Therefore, a read out word (n-bits) can be written at once during 0- or 180-degree rotation processing, while the word must be written n times during 90- or 270-degree rotation processing, and the rotation processing requires a long time.

Thus in the conventional rotation processing system, only a memory-to-memory operation is allowed. A compression/expansion processing system or an enlargement/reduction processing system employing a pipeline processing method in units of words cannot be directly connected to the rotation processing system. Thus, a processing time of the image data rotation processing system is limited.

SUMMARY OF THE INVENTION

The present invention has been made in consideration of the above situation It is an object of the present invention to provide a rotation processing system which can continuously rotate image data consisting of several words in units of words, one word consisting of n-bit data (n is a positive integer). The system comprises:

a first bit-order reversing section responsive to an input first instruction, for receiving a series of words of image data sequentially read out in units of words, and selectively reversing positions of bit data constituting each of the series of words like a mirror image;

a matrix conversion section responsive to an input second instruction, for selectively and sequentially receiving one of the series of words sequentially output from the first bit-order reversing section and a series of stored words sequentially read out, for holding the series of received words in the input order in units of n words, for sequentially outputting bit data of the n words held therein bit by bit from the MSB, and for sequentially outputting words each constituted by n bit data output from each of the n words as a series of rotated words, the MSB of each rotated word being one of n bit data constituting the first input word of the n words;

a buffer section responsive to an input third instruction, for selectively and sequentially receiving one of the series of words sequentially output from the first bit-order reversing section and the series of rotated words sequentially output from the matrix conversion section, for sequentially storing the series of received words in accordance with one of first and second scanned addresses determined by the third instruction, for sequentially reading out the series of stored words stored therein in accordance with the other of the first and second scanned addresses, and for outputting the series of stored words to the matrix conversion section; and a second bit-order reversing section responsive to an input fourth instruction, for selectively and sequentially receiving one of the series of stored words sequentially read out from the buffer section and the series of rotated words output from the matrix conversion section, for selectively reversing positions of the bit data constituting each of the series of received words like a mirror image, and for sequentially outputting as the image data the series of words which are selectively reversed, in units of words in the input order.

The order of holding a word input to the matrix conversion section, i.e., a rotation section, and the output order of bit data can be controlled, so that the first bit-order reversing section can be omitted, and so that a bit-order reversing circuit can be omitted from the second bit-order reversing section.

A rotation circuit in the rotation section comprises:

a first holding section for sequentially latching a series of words constituting the image data input in units of words, in units of n words in accordance with a first control instruction, each word consisting of n-bit data;

a second holding section for receiving and latching the n word latched by the first holding section in accordance with a second control instruction;

a selector group, in accordance with a third control instruction, for selecting one bit data from each word latched by the second holding section, and outputting a word constituted by selected n bit data as a rotated word; and a controller for respectively outputting the first, second, and third control instructions to the first and second holding section and the selector section in accordance with an input rotation command.

It is another object of the present invention to provide a method for rotating image data consisting of a plurality of words, a word consisting of n bits. The method comprises the steps of:

selectively and sequentially receiving and holding a series of words in accordance with a synchronization pulse; and shifting already held n words and selectively outputting bit data from the words held therein bit by bit in accordance with the synchronization pulse.

According to the image data rotation processing system of the present invention as described above, input image data can be subjected to pipeline processing in units of words. Therefore, the rotation processing system can be directly connected to other pipeline processing apparatuses, such as compression, expansion, enlargement, and reduction apparatuses. Thus, real-time processing of image data can be achieved. Since 90- or 270-degree rotation processing of image data can be executed in units of words, high-speed processing can be achieved. When a register for holding a word and a selector for outputting bit data are controlled, a bit-order reversing circuit can be omitted, thus simplifying the arrangement of the rotation processing system.

BRIEF DESCRIPTION OF THE DRAWINGS

FIG. 3 is a block diagram showing an image data rotation processing system according to a first embodiment of the present invention;

FIG. 5 is a view explaining the operation of respective sections constituting the system shown in FIG. 3;

FIG. 6 is a view showing address assignment of a page memory (not shown);

FIGS. 8A to 8D are views explaining the operation of the rotation circuit in an input raster scan mode;

FIGS. 9A to 9D are views explaining the operation of the rotation circuit in an output raster scan mode;

FIG. 11 is a view explaining operations of respective sections constituting the system shown in FIG. 10;

FIG. 12 is a block diagram showing an arrangement of an image data rotation processing system according to a third embodiment of the present invention;

FIG. 13 is a view explaining operations of respective sections constituting the system shown in FIG. 12;

FIG. 15 is a view explaining operations of respective sections constituting the system shown in FIG. 14;

DETAILED DESCRIPTION OF THE PREFERRED EMBODIMENTS

Figure 1:
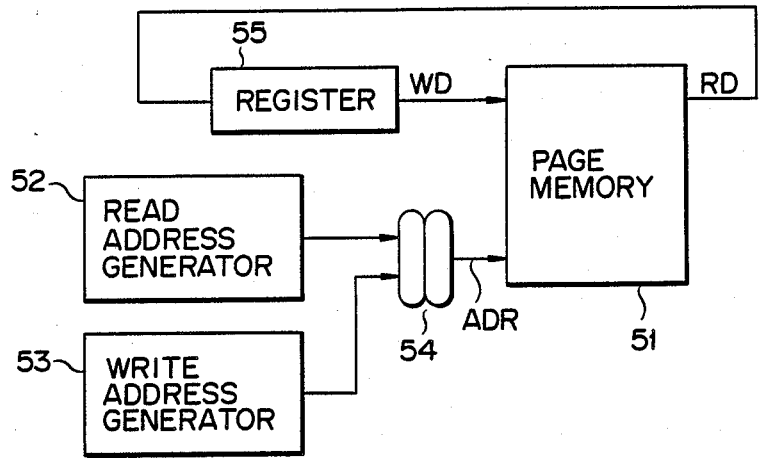
FIG. 1 is a block diagram showing an arrangement of a conventional rotation processing system.

An image data rotation processing system according to the present invention will now be described with reference to the accompanying drawings.

First, an arrangement of an image data high-speed rotation processing system according to a first embodiment of the present invention will be described with reference to FIG. 3. Referring to FIG. 3, bit-order reversing circuit 11 sequentially receives a series of words constituting image data read out from a page memory (not shown) in units of words, and selectively reverses the bit order so that the MSB and LSB positions of the input word are reversed as if it were reflected by a mirror, in accordance with a first instruction from controller 18. Bit-order reversing circuit 12 has the same function as above. In this embodiment, one word consists of 8 bits. The output from bit-order reversing circuit 11 is supplied to rotation circuit 13 and selector 16.

Figure 4:
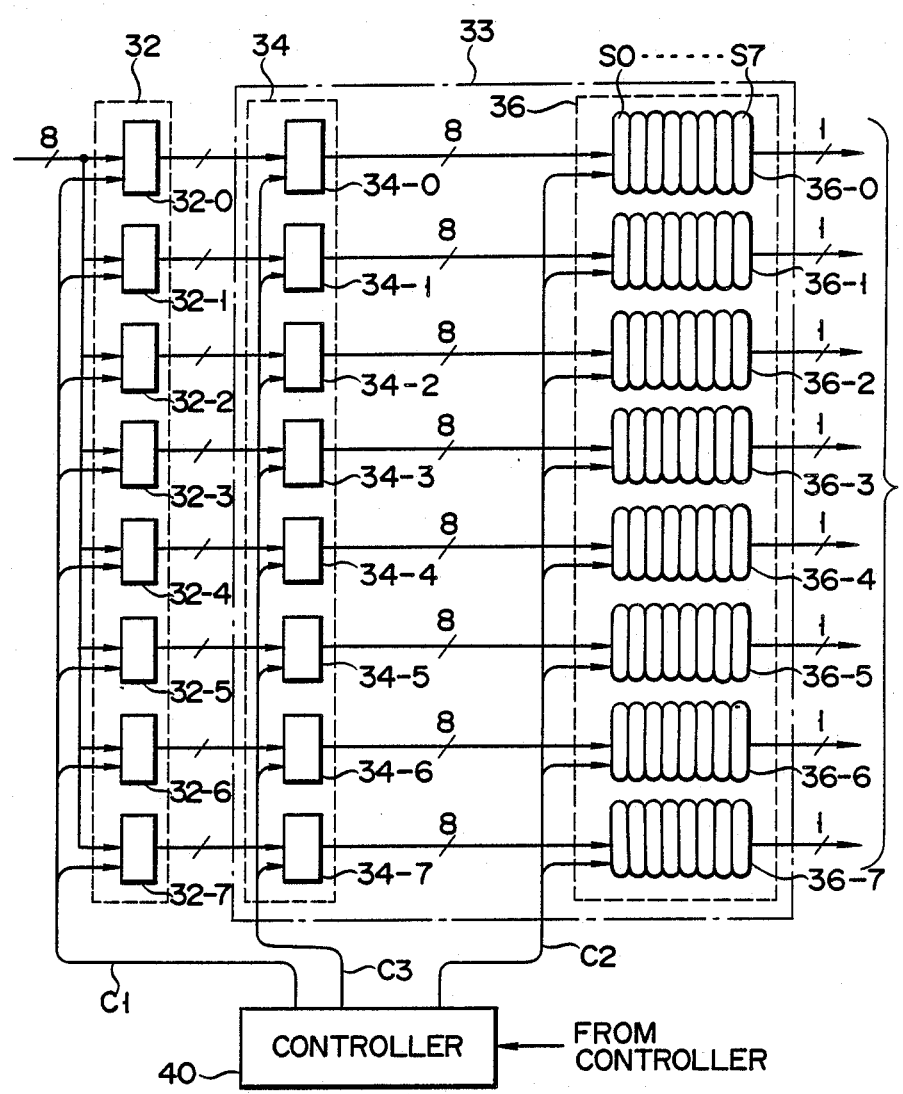
FIG. 4 is a block diagram showing a detailed arrangement of a rotation circuit used in FIG. 3.

FIG. 4 shows a detailed block diagram of rotation circuit 13. Rotation circuit 13 comprises first register group 32, second register group 34, selector group 36, and controller 40. First and second register groups 32 and 34, respectively, have eight 8-bit registers 32-0 to 32-7 and 34-0 to 34-7. Resisters $32-i$ (i =0 to 7) are connected to register $34-i$ (i =0 to 7), respectively. Selector group 36 comprises eight 8-to-1 selectors 36-0 to 36-7. Selector $36-i$ (i =0 to 7) receives a word from register $34-i$ (i =0 to 7). Controller 40 supplies bit signals of 8-bit control signal C1 to respective registers $32-i$ (i =0 to 7) in first register group 32, 1-bit control signal C3 to registers $34-i$ (i =0 to 7) in second register group 34, and 3-bit control signal C2 to selectors $36-i$ (i =0 to 7) in selector group 36, in accordance with a second instruction from controller 18.

Eight words of a series of words input to rotation circuit 13 are sequentially latched by registers 32-0 to 32-7 in accordance with each of the bit signals of control signal C1 from controller 40. FIGS. 17A to 17H show the bit signals of control signal C1 in this case. When the eight words are latched by first register group 32, the words latched by first register group 32 are shifted to and held in second register group 34 in accordance with control signal C3 shown in FIG. 17I. The word held in register $34-i$ (i =0 to 7) of second register group 34 is supplied to corresponding selector $36-i$ (i =0 to 7). Selectors $36-i$ (i =0 to 7) receive control signal C2 shown in FIGS. 17J to 17L from controller 40 and sequentially output bit data bit by bit from the MSB. The bit data output from selectors $36-i$ (i =0 to 7) constitute words which are respectively rotated through 90 degrees. That is, eight words which are rotated through 90 degrees are constituted by bit data sequentially output from selectors $36-i$ (i =0 to 7). The bit data of a word input to register 32-0 serve as the MSBs of 90-degree rotated words. Each time a 90-degree rotated word is output from selector group 36, the next word before rotation is sequentially input to first register group 32. In this manner, words can be successively input, the input words can be matrix-converted, and 90-degree rotated words can be output in a pipeline manner.

Selector 16 receives and selectively outputs to buffer memory 15 one of the outputs from bit-order reversing circuit 11 and rotation circuit 13, in accordance with a third instruction from controller 18.

Buffer memory 15 has two memories RAM1 and RAM2. Each of memories RAM1 and RAM2 has a capacity corresponding to the number of bits constituting a word in the vertical direction (in this embodiment, 8) and corresponding to the number of words for one horizontal line when scanned on a page memory (not shown). Buffer memory 15 receives a scanned address generated by address generator 19 in accordance with a fourth instruction from controller 18. When an input word is stored in memory RAM1, a word stored in memory RAM2 is read out therefrom, in accordance with an instruction from controller 18 and vice versa. The word read out from buffer memory 15 is supplied to rotation circuit 14 and selector 17.

Rotation circuit 14 has the same arrangement as that of rotation circuit 13 and acts in the same manner as circuit 13 in a fifth instruction from controller 18. Selector 17 selectively supplies to bit-order reversing circuit 12 one of the outputs from rotation circuit 14 and buffer memory 15 in accordance with a sixth instruction from controller 18. Bit-order reversing circuit 12 selectively reverses the bit order of an input word and outputs the reversed word, in accordance with a seventh instruction from controller 18 in the same manner as bit-order reversing circuit 11.

Figure 2A:
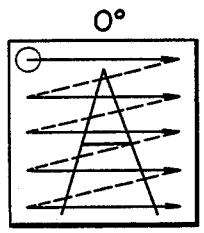
FIGS. 2A to 2D are views showing a scanned address designation order of a page memory in the conventional rotation processing system shown in FIG. 1.

The operation of the first embodiment will now be described. A mode wherein image data raster-scanned as shown in FIG. 2A to perform an expansion processing is sequentially input as a series of words to bit-order reversing circuit 11 in units of words will be referred to as an input raster scan mode hereinafter. A mode wherein image data is to be subjected to rotation processing, to be raster-scanned and to be sequentially output from the rotation processing system to a compression processing apparatus (not shown) connected thereto to perform a compression processing will be referred to as an output raster scan hereinafter.

One word is constituted by 8 bits in the horizontal direction, and it is assumed that a page memory (not shown) has a capacity of 5 words (40 bits) in the horizontal direction and 40 words in the vertical direction, as shown in FIG. 6. Therefore, memories RAM1 and RAM2 each have a capacity of 5 words in the horizontal direction and 8 words in the vertical direction. Addresses 1 to 40 shown in FIG. 6 are assigned to memories RAM1 and RAM2. (In FIGS. 9A to 9D, the addresses of memory RAM2 are indicated by 41 to 80 for the sake of illustrative convenience.)

An operation in the input raster scan mode wherein image data raster-scanned as shown in FIG. 2A are sequentially input to the arrangement of the first embodiment in units of words will now be described with reference to the following cases: (1) when a 0-degree rotation command is input to controller 18; (2) when a 90-degree rotation command is input; (3) when a 180-degree rotation command is input; and (4) when a 270-degree rotation command is input.

(1) In the case of 0-degree rotation command

Referring to FIG. 5, image data, which are sequentially input in units of 8 bits, i.e., words, are not subjected to bit-order reversing processing in bit-order reversing circuit 11, and are stored in memory RAM1 of buffer memory 15 through selector 16 at first in units of 40 words. A series of words constituting the image data in this case is sequentially stored at addresses 1 to 40 in FIG. 6. Thereafter, successively input 40 words which are read out from addresses 41 to 80 of the page memory are sequentially stored in memory RAM2 at addresses 1 to 40. When 40 words are stored in memory RAM1, the words written at addresses 1, 2, 3, 4, and 5 are sequentially read out while the successively input five words are written at addresses 1, 2, 3, 4, and 5 of memory RAM2, and are output through selector 17 and bit-order reversing circuit 12. The output words are sequentially stored in, e.g., the page memory, as shown in FIG. 2A. Next, the words read out from addresses 6 to 10 are transferred in the same manner as described above.

(2) In the case of 90-degree rotation command

Figure 7A:
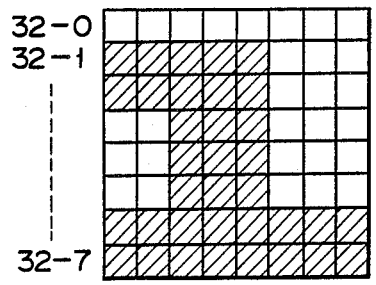
FIGS. 7A to 7H are views explaining the operation of the first embodiment.

Referring to FIG. 5, when a 90-degree rotation input command is input to controller 18, a series of words are stored in buffer memory 15 through bit-order reversing circuit 11 and selector 16 in the same manner as described above. FIGS. 8A and 8B illustrate this state. When 40 words are stored in memory RAM1, next 40 words (words read out from addresses 41 to 80 of the page memory) are written in memory RAM2, as shown in FIG. 8B. While the words from addresses 41 to 48 are stored in memory RAM2, addresses 1, 6, 11, 16, 21, 26, 31, and 36 of memory RAM1 are designated by address generator 19. The words stored at the designated addresses are sequentially read out, and are sequentially stored in order from register 32-0 of first register group 32 of rotation circuit 14 in accordance with control signal C1 shown in FIGS. 17A to 17H. More specifically, a word read out from address 1 is stored in register 32-0, and a word read out from address 6 is stored in register 32-1. This also applies to the subsequent words. FIG. 7A illustrates this state. In this case, the leftmost bit is the MSB, and the rightmost bit is the LSB. FIG. 7A sequentially illustrates the words stored at addresses 1, 6, 11, ..., 36 from the above.

Figure 2B:
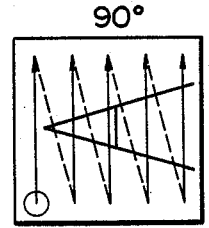
Figure 7B:
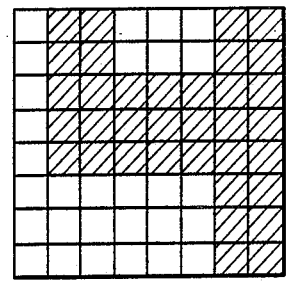
Figure 7C:
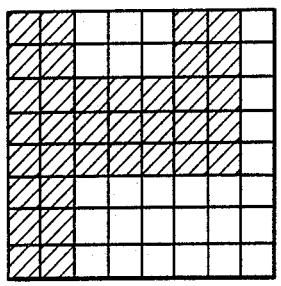
Figure 7D:
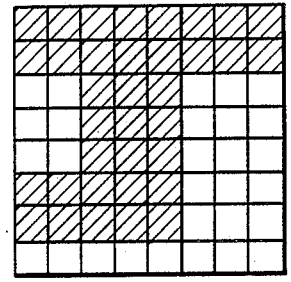
Figure 7E:
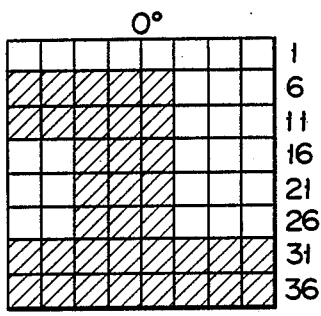
Figure 7F:
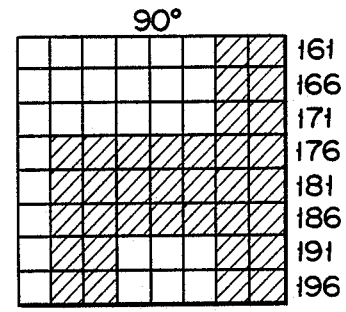
Figure 17:
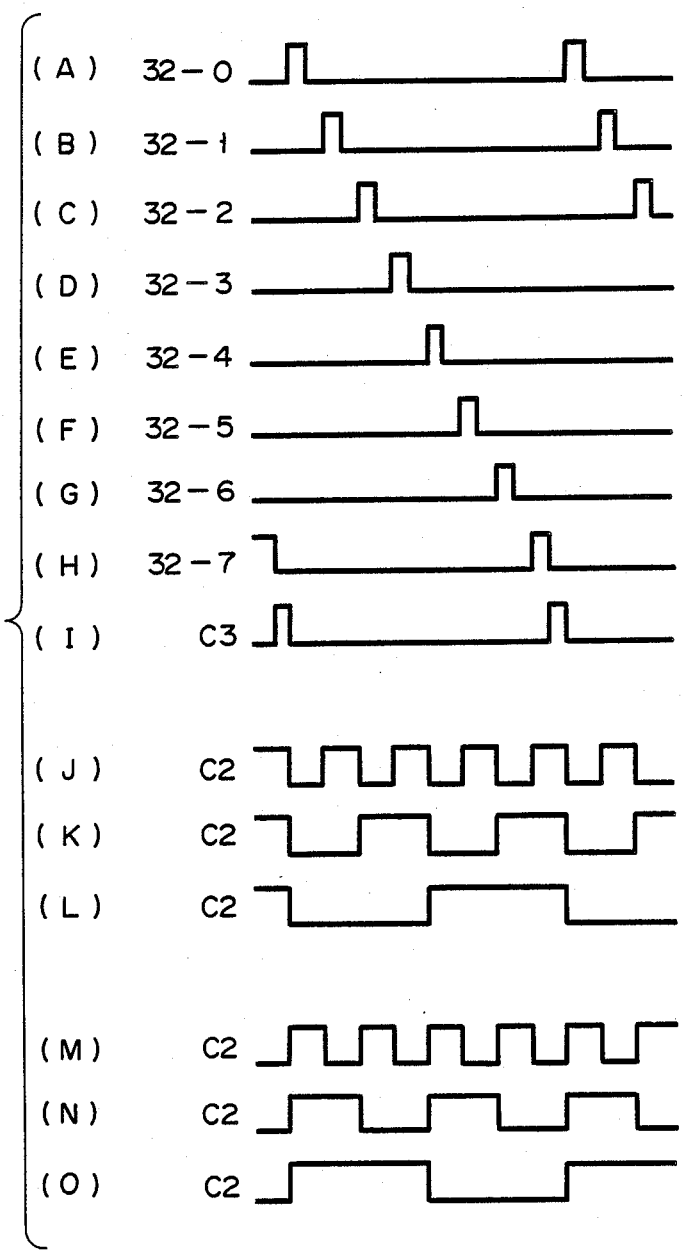
FIGS. 17A to 17X and FIGS. 18A to 18E are timing charts explaining the operation of the rotation circuit.
Figure 17:
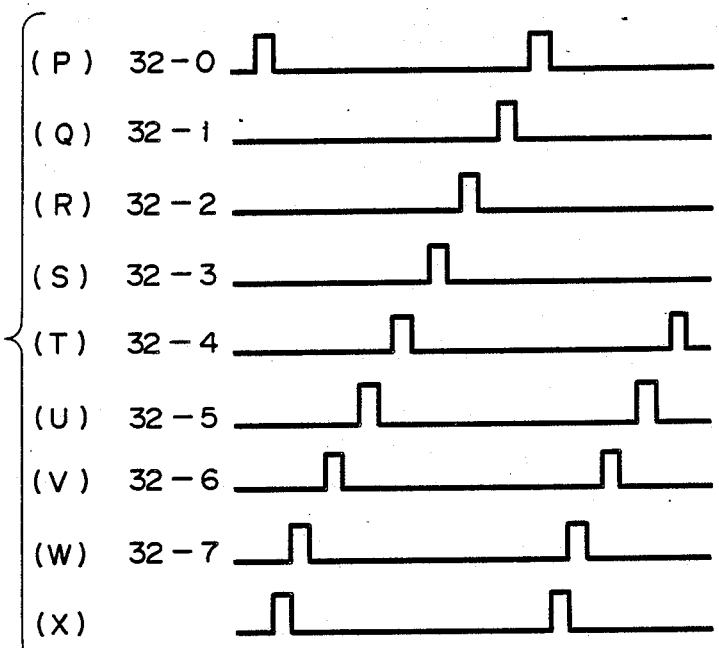

After a word from address 36 of memory RAM1 is input, i.e., when eight words are input, the words stored in first register group 32 are latched by second register group 34 in accordance with control signal C3 shown in FIG. 17I. Thereafter, while words from addresses 49 to 56 of the page memory are stored at addresses 9 to 16 of memory RAM2, words stored at addresses 7, 12, ..., 37 of memory RAM1 are sequentially latched by first register group 32. FIG. 8C illustrates this state. As the words stored at addresses 2, 7, ..., 37 are sequentially input to first register group 32, the eight words shown in FIG. 7A are sequentially read out from the leftmost bits (MSBs) bit by bit in accordance with control signal C2 shown in FIGS. 17J to 17L. FIG. 7B illustrates the eight rotated words. In FIG. 7B, bit data of the rotated word in shown in the horizontal direction, the leftmost bit being the MSB, and the rotated words are shown from the above in the selected order or 1, 2, 3, 4 and 5. FIG. 8D shows the output timings of these words. These rotated words are output through selector 17 and bit-order reversing circuit 12. When the 90-degree rotation command is executed, since the page memory is scanned as shown in FIG. 2B, the rotated words are stored at addresses 196, 191, 186, 181, 176, 171, 166, and 161 of the page memory, respectively. FIG. 7F illustrates this state.

(3) In the case of 180-degree rotation command

Figure 2C:
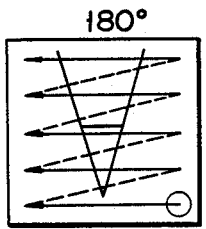
Figure 7G:
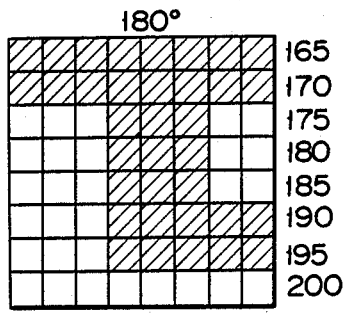

Referring to FIG. 5, when a 180-degree rotation command is input to controller 18, a series of words are stored in buffer memory 15 in the same manner as described above. Thereafter, words are sequentially read out from addresses 1 to 5 of memory RAM1, and are supplied to bit-order reversing circuit 12 through selector 17. The words input to bit-order reversing circuit 12 are subjected to bit-order reversing processing, and are output. When these reversed words are stored in the page memory, the page memory is scanned as shown in FIG. 2C, so that the words are stored at addresses 200, 199, 198, 197, and 196. In this manner, the words stored at addresses 200, 195, 190, 185, 180, 175, 170, and 165 are as shown in FIG. 7G.

(4) In the case of 270-degree rotation command

Figure 2D:
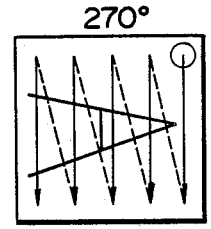
Figure 7H:
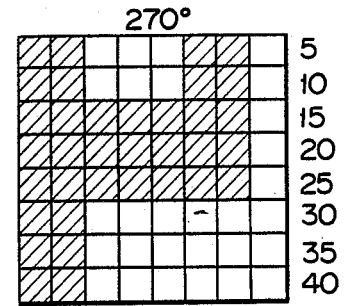

Referring to FIG. 5, words stored in buffer memory 15 through bit-order reversing circuit 11 in the same manner as in the 90-degree rotation command are rotated by rotation circuit 14 as shown in FIG. 7B in the same manner as in the 90-degree rotation command. Thereafter, the words are subjected to bit-order reversing processing in bit-order reversing circuit 12, as shown in FIG. 7C. In the case of the 270-degree rotation command, since the page memory is scanned as shown in FIG. 2D, the words shown in FIG. 7C are stored at addresses 5, 10, 15, 20, 25, 30, 35, and 40 of the page memory, as shown in FIG. 7H.

A case of the output raster scan mode will be considered wherein the already rotated image data is read out from the page memory in accordance with a rotation angle and after the already rotated image data is subjected to rotation processing to have a rotation angle of 0 degree, memories RAM1 and RAM2 are scanned, as shown in FIG. 2A. In this case, a series of words constituting image data are sequentially read out from the page memory in accordance with the presently designated rotation angle, as shown in FIGS. 2A to 2D. The following cases will be explained below with reference to FIG. 5: (1) when the 0-degree rotation command is input to controller 18 for non-rotated image data; (2) when the 90-degree rotation command is input for 270-degree rotated image data; (3) when the 180-degree rotation command is input for 180-degree rotated image data; and (4) the 270-degree rotation command is input for 90-degree rotated image data.

(1) In the case of 0-degree rotation command

When the 0-degree rotation command is input, words at addresses 0 to 40 are read out from the page memory, as shown in FIG. 2A, and are stored in buffer memory 15 through bit-order reversing circuit 11 and selector 16. While words at addresses 41 to 80 are read out and are stored in memory RAM2, 5 words per line are read out from addresses 1 to 40 of memory RAM1 designated by address generator 19, and are output through bit-order reversing circuit 12.

(2) In the case of 90-degree rotation command

When the 90-degree rotation command is generated with respect to image data which have been already rotated through 270 degrees and are stored in the page memory, the page memory is scanned as shown in FIG. 2D. Therefore, the words are read out from addresses 5 to 200 and then 4 to 199, and so on and are supplied to bit-order reversing circuit 11. A series of readout words are subjected to bit-order reversing processing in bit-order reversing circuit 11, and are supplied to rotation circuit 13 as shown in FIG. 9A. Words stored at addresses 5, 10, 15, 20, 25, 30, 35, and 40 of the page memory as shown in FIG. 7H are latched by first register group 32. The supplied words are rotated through 90 degrees in the same manner as in the 90-degree rotation command in the input raster scan mode, as shown in FIG. 7A. The outputs from rotation circuit 13 are stored at addresses 1, 6, 11, 16, . . . , 36 of memory RAM1 of buffer memory 15 in the vertical direction through selector 16, as shown in FIG. 9B. The same processing is repeated up to the fifth column, and all the words are stored in memory RAM1. While the words stored at addresses 5, 10, 15, 20, 25, 30, 35, and 40 of the page memory are rotated, the words stored at addresses 45, 50, 55, 60, 65, 70, 75, and 80 of the page memory are respectively latched by registers 32-0 to 32-7 in the input order to rotation circuit 13. When 40 rotated words are stored in memory RAM1, memory RAM1 is accessed in the direction shown in FIG. 2A, and raster-scanned words are output. While the rotated words are read out from memory RAM1, the words rotated by rotation circuit 13 are stored at addresses 1, 6, 11, 16, . . . , 36 of memory RAM2. When 40 words are stored in memory RAM2, memory RAM2 is then raster-scanned, and the rotated words are again stored in memory RAM1. A series of words output from buffer 15 are output to, e.g., a compression apparatus (not shown) through selector 17 and circuit 12.

(3) In the case of 180-degree rotation command

When the 180-degree rotation command is input to controller 18, the words are read out from the page memory upon scanning as shown in FIG. 2C. Therefore, words at addresses 200, 199, 198, . . . , 196, . . . , 195, 190, . . . of the page memory are scanned. When the words shown in FIG. 7G are input, each word is reversed by bit-order reversing circuit 11, and is stored in memory RAM1 of buffer memory 15. In this case, image data shown in FIG. 7G are stored in the locations corresponding to addresses 1, 6, . . . , 36 of memory RAM1. Thereafter, when 40 words are stored in memory RAM1, memory RAM1 is scanned as described above so that the words are sequentially read out therefrom, and are output to the compression apparatus through selector 17 and bit-order reversing circuit 12.

(4) In the case of 270-degree rotation command

When the 270-degree rotation command is input to controller 18, the image data stored in the page memory are scanned as shown in FIG. 2B, and are input to bit-order reversing circuit 11. The image data are stored at addresses 196, 191, 186, 181, 176, 171, 166, and 161 of the page memory, as shown in FIG. 7F. The readout words are rotated through 90 degrees in the same manner as in the 90-degree rotation command, and are output to memory RAM1 through selector 16. The rotated words are stored at addresses 1, 6, . . . , 36 of memory RAM1 in the same manner as in the 90-degree rotation command. Thereafter, memory RAM1 is scanned as shown in FIG. 2A as in the 90-degree rotation command, and the rotated words are read out therefrom. The readout words are output to an external apparatus through selector 17 and bit-order reversing circuit 12.

Figure 10:
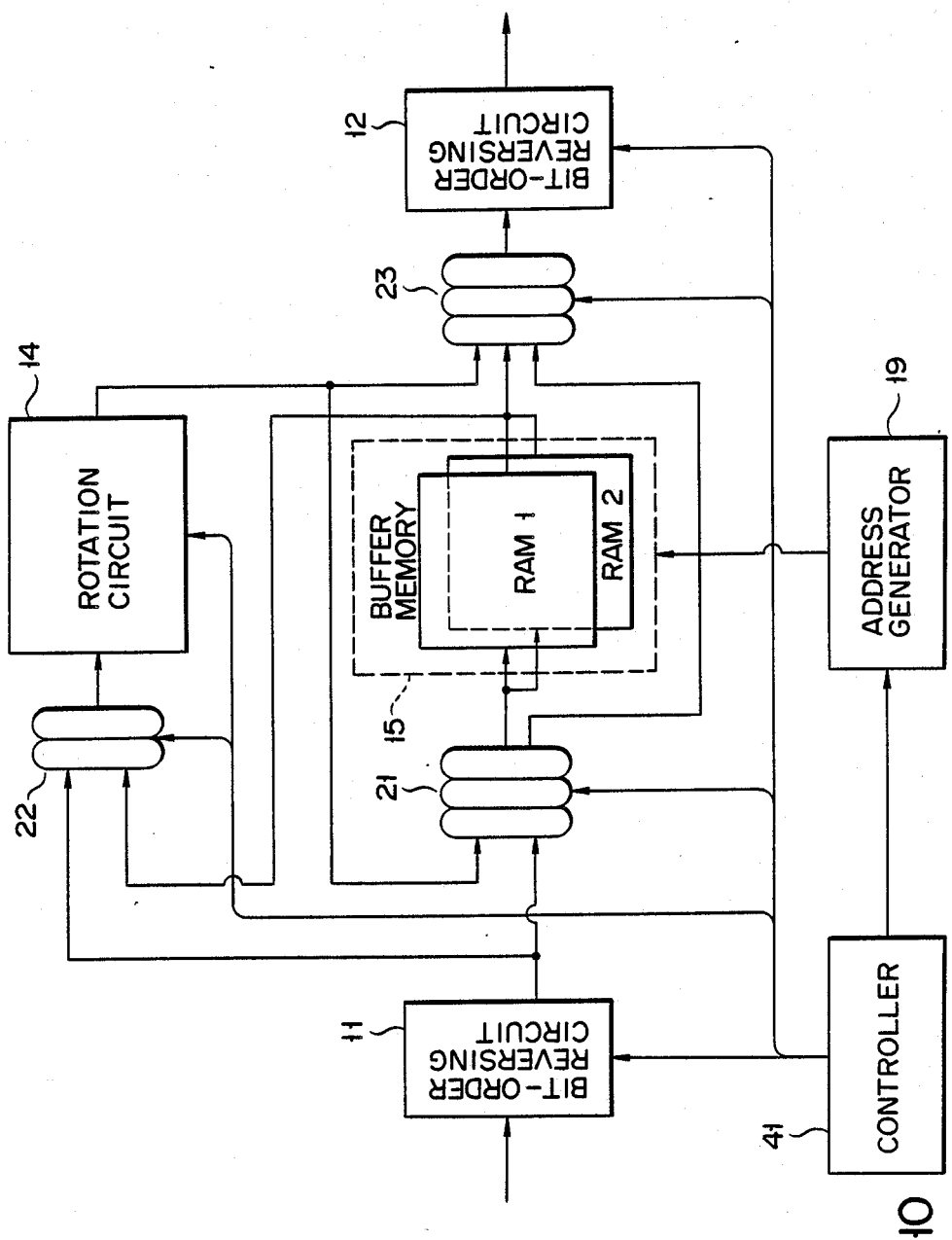
FIG. 10 is a block diagram showing an arrangement of an image data rotation processing system according to a second embodiment of the present invention.

An image data rotation processing system according to a second embodiment of the present invention will now be described with reference to FIG. 10. The same reference numerals in FIG. 10 denote the same parts as in the first embodiment shown in FIG. 3. More specifically, the same bit-order reversing circuits 11 and 12, buffer memory 15, rotation circuit 14, and address generator 19 as those in in FIG. 3 are adopted. FIG. 11 shows the operations of these components and selectors 21, 22, and 23 in accordance with instructions from controller 41.

Referring to FIG. 11, controller 41 controls selector 21 to select words from bit-order reversing circuit 11 upon execution of the 0or 180-degree rotation command in the input or output raster scan mode and to output the selected words to selector 23, and to select words from rotation circuit 14 in the output raster scan mode upon execution of the 90- or 270-degree rotation command and from circuit 11 in the input raster scan mode upon execution of the 90- or 270-degree rotation command and to output the selected words to buffer memory 15. Controller 41 controls selector 22 to select words from buffer memory 15 upon execution of the 90- or 270-degree rotation command in the input raster scan mode, and to select words from bit-order reversing circuit 11 upon execution of the 90- or 270-degree rotation command in the output raster scan mode. Controller 41 controls selector 23 to select words from selector 21 upon execution of the 0- or 180-degree rotation command in the input or output raster scan mode, to select words from buffer memory 15 upon execution of the 90- or 270-degree rotation command in the output raster scan mode, and to select words from rotation circuit 14 upon execution of the 90- or 270-degree rotation command in the input raster scan mode.

When the selectors are controlled as described above, the processing path of a series of words which are input in accordance with the 90- or 270-degree rotation command in the input or output raster scan mode is the same as that in the first embodiment shown in FIG. 3. Since the operations of bit-order reversing circuits 11 and 12, buffer memory 15, rotation circuit 14, and address generator 19 are the same as those in the first embodiment and since controller 41 controls these in the same manner as the first embodiment, the second embodiment operates in the same manner as the first embodiment. When the 0 or 180-degree rotation command is input to controller 41, words input to selector 21 through bit-order reversing circuit 11 are output to bit-order reversing circuit 12 through selector 23 in order to improve the processing speed unlike in the first embodiment. Controller 41 controls circuits 11 and 12 in the same manner as controller 18.

An image data rotation processing system according to a third embodiment of the present invention will now be described with reference to FIG. 12. Buffer memory 15, address generator 19, and bit-order reversing circuit 12 are the same as those in the first embodiment. Bit-order reversing circuit 12 is used when the 0- or 180-degree rotation command is executed with respect to words input to the system in the input or output raster scan mode. Buffer memory 15 stores words input through selector 21' when the 90- or 270-degree rotation command is executed in the input raster scan mode, and words rotated by rotation circuit 14' when the 90- or 270-degree rotation command is executed in the output raster scan mode, in the same manner as in the first embodiment. The difference between rotation circuits 14' and 14 will be described later.

FIG. 13 shows the operations of the respective sections constituting the arrangement of the third embodiment. Referring to FIG. 13, controller 41' controls selector 21' to select words from an external apparatus upon execution of the 90- or 270-degree rotation command in the input raster scan mode, and to select words from rotation circuit 14' upon execution of the 90- or 270-degree rotation command in the output raster scan modes. Controller 41' controls selector 22' to select words from an external apparatus upon execution of the 0-, 90-, 180-, or 270-degree rotation commands in the output raster scan mode and to select words from buffer memory 15 upon execution of the 90- or 270-degree rotation commands and words from the external apparatus upon execution of 0- and 180-degree rotation command in the input raster scan mode. Controller 41' controls selector 23' to select words from bit-order reversing circuit 12 upon execution of the 0- or 180-degree rotation command in the input or output raster scan mode, to select words from buffer memory 15 upon execution of the 90- or 270-degree rotation command in the output raster scan mode, and to select words from rotation circuit 14' upon execution of the 90- or 270-degree rotation command in the input raster scan mode.

Referring to FIG. 4, first and second register groups 32 and 34, and selector group 36 are the same as those in rotation circuit 14 in the first embodiment, but controller 40 is different from that of the first embodiment an basic arrangement of rotation circuit 14' is the same as that of circuit 14.

When the 90-degree rotation command is input in the input raster scan mode, control signal C1 output from controller 40 is as shown in FIGS. 17A to 17H, and control signal C2 are as shown in FIGS. 17J to 17L. Thus, rotation circuit 14' is operated in the same manner as in the first embodiment. However, when the 270-degree rotation command is input in the input raster scan mode, control signal C1 output from controller 40 is different from that in the first embodiment, as shown in FIGS. 17P to 17W. More specifically, words input to first register group 32 from buffer memory 15 are sequentially latched in the order not from register 32-0 but from register 32-7 to 32-0, in accordance with control signal C1. Therefore, when words as shown in FIG. 7E are input to first register group 32, the words are latched by registers 32−i (i =0 to 7), as shown in FIG. 7D. Since the output bit data constituting a word latched by register 32-0 serve as the MSBs, if they are latched in the order described above, the bit order of the word rotated through 90 degrees is also reversed.

A case will be described wherein the 90-degree rotation command is executed in the output raster scan mode. Image data stored in the page memory are scanned as shown in FIG. 2D, and are sequentially input in units of words. The input words are sequentially latched by first register group 32 of rotation circuit 14' in the order from register 32-0 to 32-7 in accordance with control signals C1 from controller 40, as shown in FIGS. 17A to 17H. Therefore, words are latched by registers 32−i (i =0 to 7), as shown in FIG. 7H. Control signals C2 have waveforms shown in FIGS. 17M to 17O. Therefore, selector group 36 outputs words held in registers 34−i (i =0 to 7) of second register group 34 bit by bit from their LSBs. The rotated words output described above are stored in buffer memory 15 in the same manner as in the first embodiment. The rotated words are also reversed, as shown in FIGS. 7A and 7H.

A case will be described wherein the 270-degree rotation command is executed in the output raster scan mode. The image data stored in the page memory are scanned as shown in FIG. 2B, and are sequentially input in units of words. The input words are sequentially latched by first register group 32 of rotation circuit 14' in the order from register 32-0 to register 32-7 in accordance with control signals C1 from controller 40, as shown in FIGS. 17A to 17H. Control signals C2 have waveforms shown in FIGS. 17J to 17L. Therefore, selector group 36 outputs words held in registers 34−i (i =0 to 7) of second register group 34 bit by bit from their MSBs as shown in FIGS. 7A and 7B. The rotated words output described above are stored in buffer memory 15 in the same manner as in the first embodiment.

When the 0- or 180-degree rotation command is executed in the input or output raster scan mode, externally input words are supplied to bit-order reversing circuit 12 through selector 22'. Upon execution of the 0-degree rotation command, the input words are output from selector 23' through bit-order reversing circuit 12.

Upon execution of the 180-degree rotation command, the input words are subjected to bit-order reversing processing in bit-order reversing circuit 12, and the reversed words are output from selector 23'.

Figure 14:
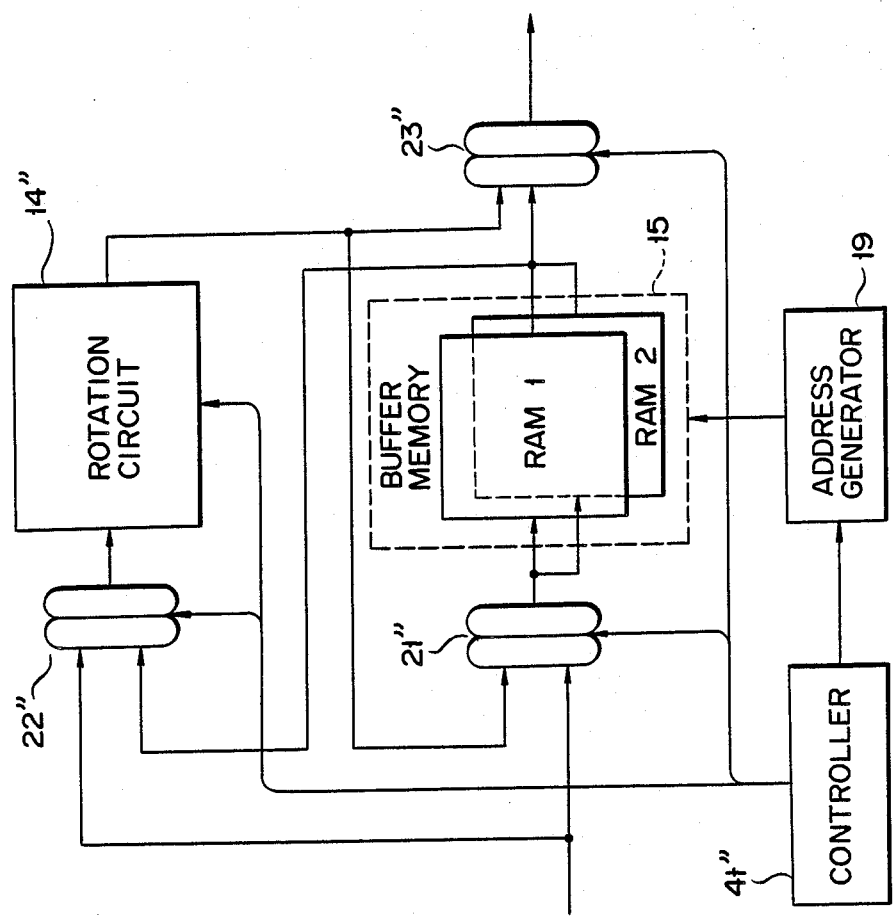
FIG. 14 is a block diagram showing an arrangement of an image data rotation processing system according to a fourth embodiment of the present invention.

A fourth embodiment will now be described with reference to FIG. 14. Buffer memory 15 and address generator 19 are the same as those in the first embodiment. Buffer memory 15 stores words input through selector 21" when the 90- or 270-degree rotation command is executed in the input raster scan mode, and words rotated by rotation circuit 14" when the 90- or 270-degree rotation command is executed in the output raster scan mode, in the same manner as in the first embodiment. The difference between rotation circuits 14" and 14' will be described later.

FIG. 15 shows the operations of the respective sections constituting the arrangement of the fourth embodiment. Referring to FIG. 15, controller 41" controls selector 21" to select words from an external apparatus upon execution of the 90- or 270-degree rotation command in the input raster scan mode, and to select words from rotation circuit 14" upon execution of the 90- or 270-degree rotation command in the output raster scan mode. Controller 41" controls selector 22" to select words from an external apparatus upon execution of the 0- or 180-degree rotation command in the input or output raster scan mode, to select words from buffer memory 15 upon execution of the 90- or 270-degree rotation command in the input raster scan mode, and to select words from the external apparatus upon execution of the 90- or 270-degree rotation command in the output raster scan mode. Controller 41" controls selector 23" to select words from rotation circuit 14" upon execution of the 0-or 180-degree rotation command in the input or output raster scan mode, to select words from buffer memory 15 upon execution of the 90- or 270-degree rotation command in the output raster scan mode, and to select words from rotation circuit 14" upon execution of the 90- or 270-degree rotation command in the input raster scan mode.

Figure 16:
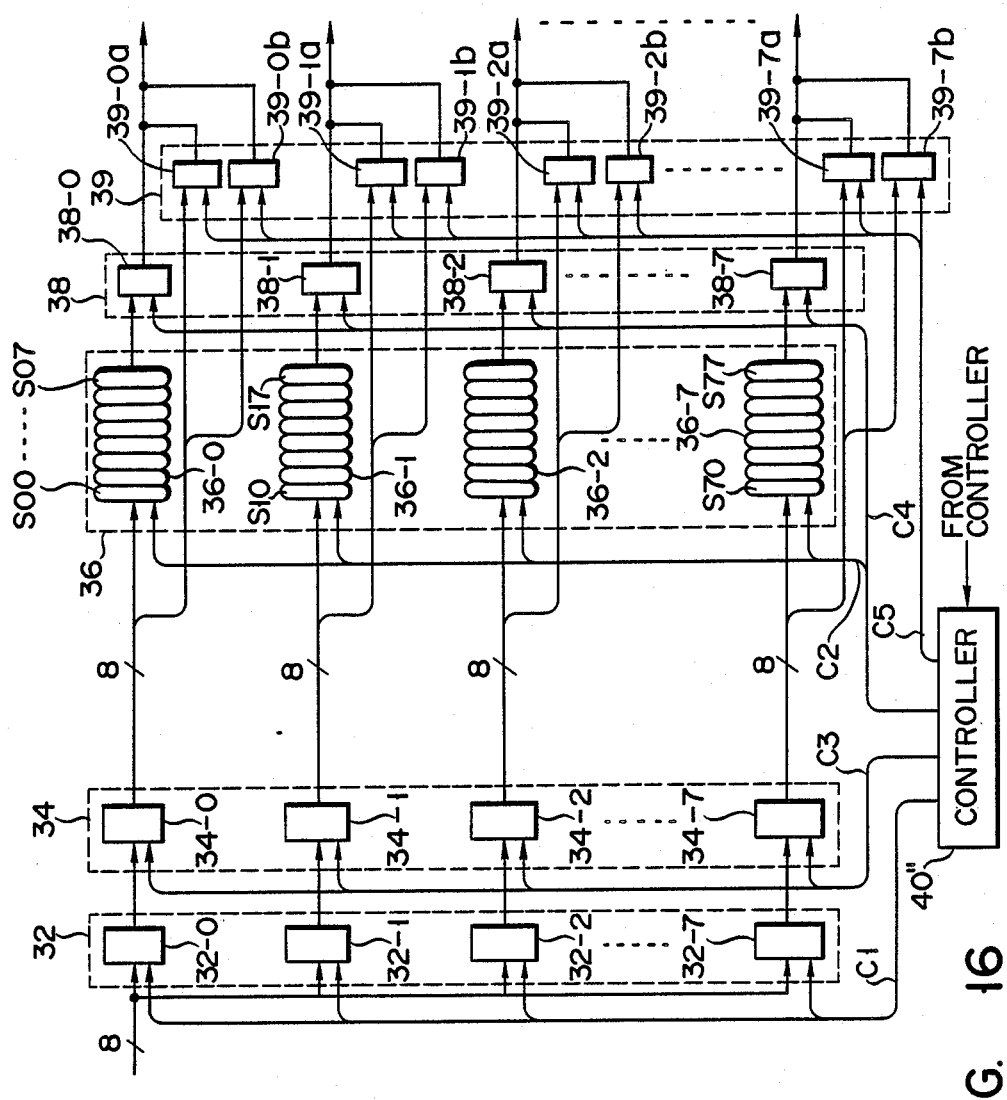
FIG. 16 is a detailed block diagram of a rotation circuit in the fourth embodiment.

FIG. 16 shows the arrangement of rotation circuit 14'. First and second register groups 32 and 34 and selector group 36 are the same as those in rotation circuit 14. The output from selector 36−i (i =0 to 7) is supplied to one input terminal of AND gate 38−i (i =0 to 7) of first AND gate group 38. The other input terminal of AND gate 38−i receives control signal C4 from controller 40'. Control signal C4 is at logic "H" upon execution of the 90- or 270-degree rotation command, and is at logic "L" upon execution of the 0or 180-degree rotation command.

One input terminals of a pair of AND gates 39-ia and 39-ib (i =0 to 7) of second AND gate, group 39 respectively receive an ith bit and a (7 minus i) bit of the output from register 34−i of second register group 34. The other input terminal of each of AND gates 39-ia and 39-ib receives control signal C5 from controller 40". The outputs from AND gates 39-ia and 39-ib are wired-OR with the output from AND gate 38−i of first AND gate group 38.

Figure 18:
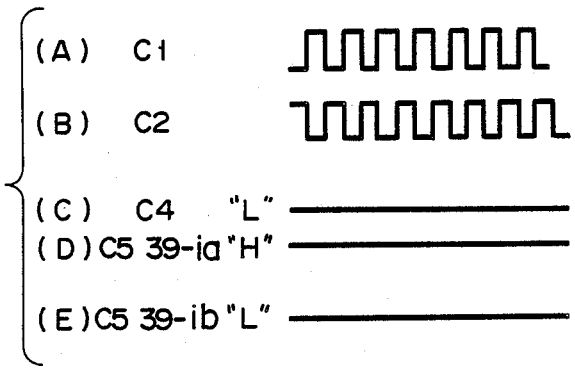

When the 0-degree rotation command is input, input words are latched by all 8-bit registers 32−i (i =0 to 7) in accordance with control signal C1 shown in FIG. 18A, and are shifted to second register group 34 in accordance with control signal C2 shown in FIG. 18B. Controller 40" outputs control signal C4 as shown in FIGS. 18C to 18E so as to inhibit an output from AND gate 38-i, outputs control signal C5 to inhibit an output from AND gate 39-ib, and outputs control signal C5 to allow an output from AND gate 39-ia. Therefore, a word input to register group 32 passes through.

When the 180-degree rotation command is input, the words are latched by second register group 34 in the same manner as described above. Controller 40" outputs control signal C4 so as to inhibit an output from AND gate 38−i, outputs control signal C5 to inhibit an output from AND gate 39-ia, and outputs control signal C5 to allow an output from AND gate 39-ib. In this manner, rotation circuit 14" is operated in the same manner as the bit-order reversing circuit.

When the 90- or 270-degree rotation commands is executed, control signal C4 is output to allow an output from AND gate 38-i, and control signals C5 are output to inhibit outputs from AND gates 39-ia and 39-ib. In this manner, rotation circuit 14" is operated in the same manner as rotation circuit 14'.

Figure 19:
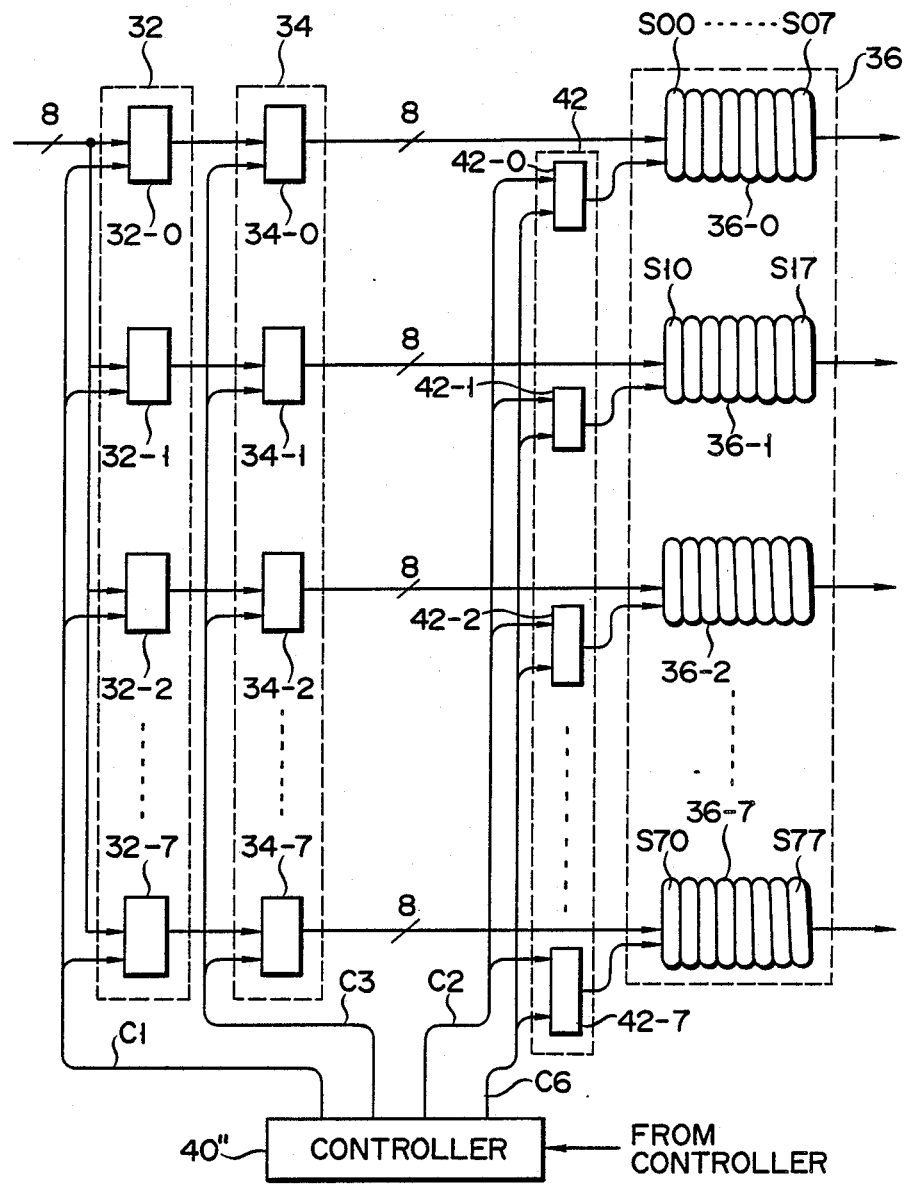
FIG. 19 is a detailed block diagram of another arrangement of the rotation circuit of the fourth embodiment.

FIG. 19 shows another embodiment of rotation circuit 14'''. First and second register groups 32 and 34 and selector group 36 are the same as those in rotation circuits 14 and 14'. Control signal C2 output from controller 40''' is supplied to register 42−i of third register group 42. Control signals C6 as shown in FIGS. 17A to 17H are output in advance from controller 40''' so that control signal C2 is sequentially latched from register 42-0. The output from register 42−i is supplied to selector 36-i.

When the 0-degree rotation command is executed, words are latched in the same manner as in the embodiment shown in FIG. 16. Register 42−i selects in accordance with held control signal C2 so that an ith bit of the word held by register 34−i is output. Upon execution of the 180-degree rotation command, register 42-i selects a (7 minus i) bit in accordance with held control signal C2. In this manner, rotation circuit 14" is operated in the same manner as the bit-order reversing circuit upon execution of the 0- or 180-degree rotation command.

Upon execution of the 90- or 270-degree rotation command, control signal C2 output from controller 40" is simultaneously latched by registers 42-i in accordance with control signal C6. In this manner, rotation circuit 14" is operated in the same manner as rotation circuit 14'.

In rotation circuit 14", if each selector 36-i of selector group 36 can be directly and individually controlled by control signal C2 from controller 40" or 40''', third register group 42 and AND gate groups 38 and 39 can be omitted.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A rotation processing system capable of continuously rotating input data, comprising:
   buffer means, including first and second memory means and responsive to a first instruction, for sequentially receiving a series of first words, the series of first words being raster-scanned data and each first work includes n data bits, where n≧2, for sequentially storing the series of first words in said first memory means in a first direction in units of n data bits, for sequentially reading out a series of second words from said second memory means in a second direction in units of n data bits to obtain a series of second words, each second word including n data bits, while the series of first words is being stored in said first memory means, the second direction being orthogonal to the first direction, and for switching the functions of said first and second memory means when a predetermined number of first words is stored in said first memory means;

first matrix conversion means, connected to said buffer means and responsive to a second instruction, for selectively passing the series of second words and for selectively receiving the series of second words from said buffer means, for holding the series of second words in the received order in units of n second words, and for sequentially outputting n data bits of each of said n second words held therein, one by one in a designated bit order to obtain a series of third words, in an input raster mode;

first bit-order reversing means, connected to said first matrix conversion means and responsive to a third instruction, for selectively passing one of the series of second words and the series of the third words, and for selectively receiving one of the series of second words and the series of the third words to reverse the bit order of each received word to obtain a series of rotated words such that ith bit data of each received word is $(n-i)$th bit data of each respective rotated word, in the input raster mode; and control means, connected to said buffer means, said first matrix conversion means, and said first bit-order reversing means and responsive to an input rotation command, for selectively setting the input raster mode, for generating the first to third instructions, and for outputting the first instruction to said buffer means, the second instruction to said first matrix conversion means, and the third instruction to said first bit-order reversing means so that the rotation processing system operates in a pipelined manner.

2. A system according to claim 1, further comprising:

second bit-order reversing means, connected to said buffer means and responsive to an input fourth instruction, for selectively passing an input series of fourth words to said buffer means as the series of first words, and for selectively receiving the series of fourth words to reverse the bit order of each received word to obtain a series of fifth words such that ith bit data of each received word is $(n-i)$th bit data of each respective fifth word, in an output raster mode; and second matrix conversion means, connected to said second bit-order reversing means and said buffer means and responsive to an input fifth instruction, for selectively passing the series of fifth words to said buffer means as the series of first words and for selectively receiving the series of fifth words from said second bit-order reversing means, for holding the series of fifth words in the received order in units of n fifth words, and for sequentially outputting bit data of each of n fifth words held therein, one by one in the designated bit order to obtain the series of first words, in the output raster mode, and wherein said control means further comprises means, responsive to the rotation command, for selectively setting th output raster mode, for generating the fourth and fifth instructions, and for outputting the fourth instruction to said second bit-order reversing means, and the fifth instruction to said second matrix conversion means, and wherein said first bit-order reversing means further comprises means for outputting the series of second words as the series of rotated words.

3. A system according to claim 1, further comprising:

second bit-order reversing means, connected to said buffer means and said first matrix conversion means and responsive to an input fourth instruction, for selectively passing an input series of fourth words to said buffer means as the series of first words, and for selectively receiving the series of fourth words to reverse the bit order of each received word to obtain a series of fifth words, such that ith bit data of each received word is $(n-i)$th bit data, of each respective fifth word in an output raster mode, and wherein said first matrix conversion means further comprises means, responsive to the second instruction, for selectively passing the series of fifth words to said buffer means as the series of first words, for selectively receiving the series of fifth words from said second bit-order reversing means, for holding the series of fifth words in the received order in un its of n fifth words, and for sequentially outputting bit data of each of n fifth words held therein, one by one in the designated bit order to obtain the series of first words, in the output raster mode, and wherein said control means further comprises means, responsive to the rotation command, for selectively setting the output raster mode, for generating the fourth instruction, and for outputting the fourth instruction to said second bit-order reversing means, and wherein said first bit-order reversing means further compress means for outputting the series of second words as the series of rotated words.

4. A system according to claim 1, wherein said first matrix conversion means comprises:

first holding means for sequentially holding the series of second words in units of n second words in accordance with the second instruction;

second holding means for receiving and holding the n second words held in said first holding means at a time in accordance with the second instruction; and selection means, responsive to the second instruction, for receiving n second words from said second holding means when said selection means generates n third words from n second words held therein, for holding the n second words, and for sequentially outputting the n third words from the bit data of each of the n second words in the designated direction.

5. A rotation processing system capable of continuously rotating input data, comprising:

first selection means, responsive to an input first instruction, for selecting as a series of third words one word of a series of first words and a series of second words;

buffer means, connected to said first selection means, including first and second memory means and responsive to an input second instruction, for sequentially receiving the series of third words, each third word including n data bits, where $n \geq 2$, for sequentially storing the series of third words in said first memory means in a first direction in units of n data bits, for sequentially reading out the series of third words from said second memory means in a second direction in units of n data bits, to obtain a series of fourth words, each fourth word including n data bits, while the series of third words is being stored in said first memory means, the second direction being orthogonal to the first direction, and for switching said first and second memory means when a predetermined number of third words is stored in said first memory means;

second selection means, connected to said first selection means and said buffer means and responsive to an input third instruction, for selecting as a series of fifth words one of the series for first words and the series of fourth words;

matrix conversion means, connected to said first and second selection means and responsive to an input fourth instruction, for selectively passing the series of fifth words, for selectively receiving the series of fifth words from said buffer means, for holding the series of fifth words in the received order in units of n fifth words, and for sequentially outputting n data bits of each of n fifth words held therein, one by one in a predetermined order to obtain the series of second words;

bit-order reversing means, connected to said second selection means and responsive to an input fifth instruction, for selectively passing the series of fifth words, and for selectively receiving the series of fifth words to reverse the bit order of each received word, to obtain a series of sixth words such that ith bit doa of each received word is (n−i)th bit data of each respective fifth word;

third selection means, connected to said buffer means, said matrix conversion means, and said bit-order conversion means and responsive to an input sixth instruction, for selecting as a series of rotated words one of the series of fourth words, the series of second words, and the series of sixth words; and control means, responsive to an input rotation command, for generating the first to sixth instructions, and for outputting the first instruction to said first selection means, the second instruction to said buffer means, the third instruction to said second selection means, the fourth instruction to said matrix conversion means, the fifth instruction to said bit-order reversing means, and the sixth instruction to said third selection means, so that said rotation processing system operates in a pipelined manner.

6. A system according to claim 5, wherein the series of first words is raster-scanned data.

7. A system according to claim 5, wherein the series of rotated words is raster-scanned data.

8. A system according to claim 5, wherein the matrix conversion means comprises:

first holding for sequentially holding the series of fifth words in units of n fifth words in accordance with the fourth instruction;

second holding means for receiving and holding the n fifth words held in said first holding means at a time in accordance with the fourth instruction; and selecting means, responsive to the fourth instruction, for receiving n fifth words from said second holding means when said selecting means generates n second words from n fifth words held therein, holding the n fifth words, and sequentially outputting the n second words from the bit data of each of the n fifth words in a designated direction.

9. A system according to claim 8, wherein the designated direction is a direction from significant bit to least significant bit when a rotation angle is $\pi/2$ in an input raster scan mode and $-\pi/2$ in an output raster scan mode, and the designated direction is a direction from least significant bit to most significant bit when a rotation angle is $-\pi/2$ in the input raster scan mode and $\pi/2$ in the output raster scan mode, and wherein said control means includes means, responsive to the rotation command, for setting the input raster scan mode when the series of first words is raster-scanned data and the output raster scan mode when the series of rotated words is to be raster-scanned data.

10. A rotation processing system capable of continuously rotating data, comprising:

first selection means, responsive to a first instruction, for selecting as a series of third words one of a series of first words and a series of second words;

buffer means, connected to said first selection means, including first and second memory means and responsive to a second instruction, for sequentially receiving the series of third words, each third word including n data bits, where $n \geq 2$, for sequentially storing the series of third words in said first memory means in a first direction in units of n data bits, and for sequentially reading out the series of third words from said second memory means in a second direction in units of n data bits, to obtain a series of fourth words, each fourth word including n data bits, while the series of third words is being stored in said first memory means, the second direction being orthogonal to the first direction, and switching the functions of said first and second memory means when a predetermined number of third words is stored in said first memory means;

second selection means, connected to said first selection means and said buffer means and responsive to a third instruction, for selecting as a series of fifth words one of the series of first words and the series of fourth words;

matrix conversion means, connected to said first and second selection means and responsive to a fourth instruction, for selectively passing the series of fifth words as the series of second words and for selectively receiving the series of fifth words from said buffer means in units of n fifth words, holding the series of fifth words in the received order, for sequentially outputting n data bits of each of said n fifth words held herein, one by one in a predetermined order to obtain the series of second words, for selectively receiving the series of fifth words from said buffer means in a unit of a fifth word, for holding the received words, and for sequentially outputting predetermined data bits of each of the received words held therein to obtain the series of second words;

third selection means, connected to said buffer means and said matrix conversion means, and responsive to a fifth instruction, for selecting as a series of rotated words one of the series of fourth words and the series of second words, and control means responsive to an input rotation command, for generating the first to fifth instructions, and for outputting the first instruction to said first selection means, the second instruction to said buffer means, the third instruction to said second selection means, the fourth instruction said matrix conversion means, and the fifth instruction to said third selection means, so that said rotation processing system operates in a pipelined manner.

11. A system according to claim 10, wherein the series of first words is raster-scanned data.

12. A system according to claim 10, wherein the series of rotated words is raster-scanned data.

13. A system according to claim 10, wherein the matrix conversion means comprises:

first holding means for sequentially holding the series of fifth words in units of n fifth words or in a unit of a fifth word, in accordance with the fourth instruction;

second holding means for receiving and holding the n fifth words held in said first holding means at a time in accordance with the fourth instruction; and selecting means, responsive to the fourth instruction, for receiving n fifth words from said second holding means when said selecting means generates n second words from n fifth words held therein, for holding the n fifth words, for sequentially outputting the n second words by reading out each data bit from each of the n fifth words in a predetermined direction, and outputting the second word by reading out predetermined data bits from each of the n fifth words.

14. A system according to claim 13, wherein the designated direction is a direction from most significant bit to least significant bit when a rotation angle is $\pi/2$ in an input raster scan mode and $-\pi/2$ in an output raster scan mode, and the designated direction is a direction from least significant bit to most significant bit when a rotation angle is $-\pi/2$ in the input raster scan mode and $\pi/2$ in the output raster scan mode, and said control means includes means responsive to the rotation command, for setting the input raster scan mode when the series of first words is raster-scanned data and the output raster scan mode when the series of rotated words is to be raster-scanned data.

* * * * *